United States Patent
Huynh

(10) Patent No.: US 10,894,718 B2
(45) Date of Patent: Jan. 19, 2021

(54) DENSIFYING A NANOFIBER FOREST

(71) Applicant: Lintec of America, Inc., Richardson, TX (US)

(72) Inventor: Chi Huynh, Richardson, TX (US)

(73) Assignee: LINTEC OF AMERICA, INC., Richardson, TX (US)

(*) Notice: Subject to any disclaimer, the term of this patent is extended or adjusted under 35 U.S.C. 154(b) by 370 days.

(21) Appl. No.: 15/956,269

(22) Filed: Apr. 18, 2018

(65) Prior Publication Data
US 2018/0305212 A1 Oct. 25, 2018

Related U.S. Application Data

(60) Provisional application No. 62/489,580, filed on Apr. 25, 2017.

(51) Int. Cl.
*C01B 32/168* (2017.01)
*D02J 1/04* (2006.01)
(Continued)

(52) U.S. Cl.
CPC .............. *C01B 32/168* (2017.08); *D02J 1/04* (2013.01); *B82Y 30/00* (2013.01); *B82Y 40/00* (2013.01); *C01B 2202/08* (2013.01)

(58) Field of Classification Search
CPC . C01B 32/168; C01B 2202/08; C01B 32/158; C01B 32/159; C01B 32/16; C01B 32/162; C01B 32/164; C01B 32/166; C01B 32/17; C01B 32/172; C01B 32/176; C01B 32/178; C01B 2202/02; C01B 2202/04; C01B 2202/06; C01B 2202/10; C01B 2202/20; C01B 2202/22; C01B 2202/24; C01B 2202/26; C01B 2202/28;
(Continued)

(56) References Cited

U.S. PATENT DOCUMENTS

2008/0170982 A1* 7/2008 Zhang ............... C01B 32/15
                                                423/447.3
2017/0086709 A1    3/2017 Khine et al.

FOREIGN PATENT DOCUMENTS

JP       2016-072289       5/2016

OTHER PUBLICATIONS

Tsai, et al., Transfer of patterned vertically aligned carbon nanotubes onto plastic substrates for flexible electronics and field emission devices, Applied Physics Letters 2009; 95: 013107-1 to 013107-3 (Year: 2009).*

* cited by examiner

*Primary Examiner* — Daniel C. McCracken
(74) *Attorney, Agent, or Firm* — Greenblum & Bernstein, P.L.C.

(57) ABSTRACT

A nanofiber forest is described that has been processed to increase a number of nanofibers per unit area (referred to as "areal density" or, equivalently, "density") compared to the nanofiber forest in its as-synthesized state. This increase in areal density is accomplished by physically manipulating a deformable substrate on which the nanofiber forest is disposed. At a high level, this physical manipulation begins by transferring the nanofiber forest from a growth substrate to a deformable substrate. A surface area of the deformable substrate is reduced relative to a surface area of the substrate when the nanofiber forest was attached. This reduction in area causes the nanofibers in the forest to move closer to one another, thus increasing the number of nanofibers per unit area.

10 Claims, 10 Drawing Sheets

(51) Int. Cl.
 _B82Y 40/00_ (2011.01)
 _B82Y 30/00_ (2011.01)
(58) Field of Classification Search
 CPC ............ C01B 2202/30; C01B 2202/32; C01B 2202/34; C01B 2202/36; C01B 32/174; C01B 2200/00; D02J 1/04; B82Y 40/00; B82Y 30/00
 See application file for complete search history.

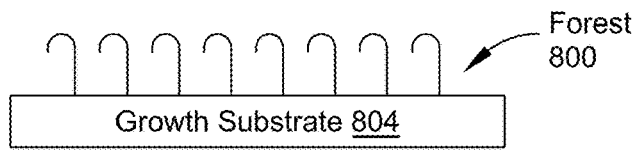
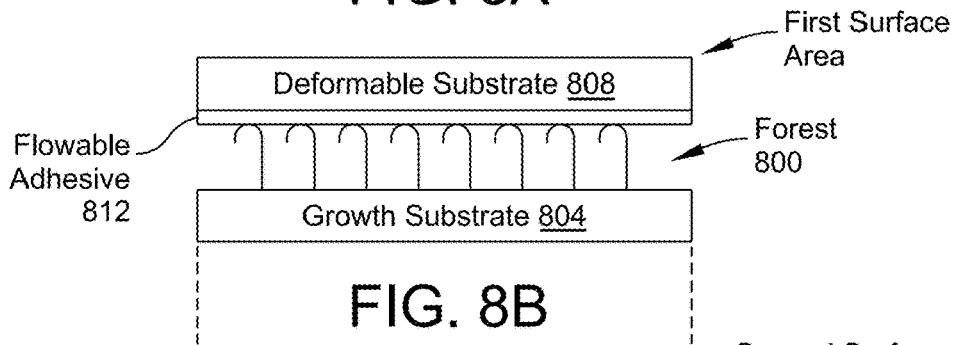
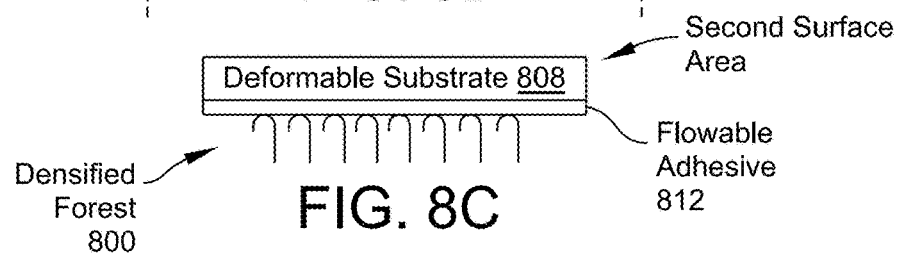
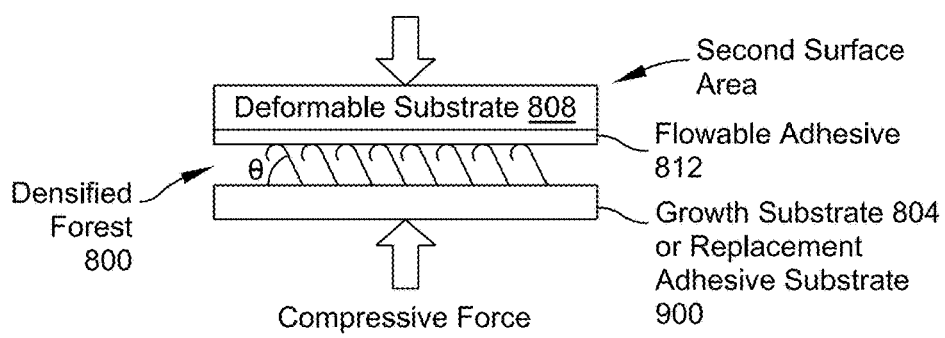
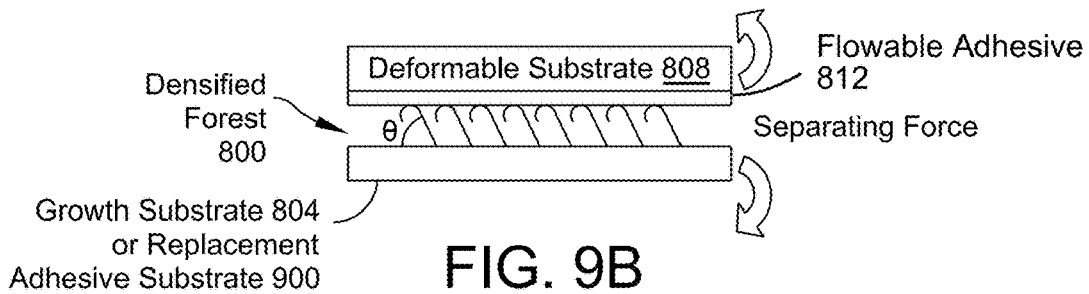
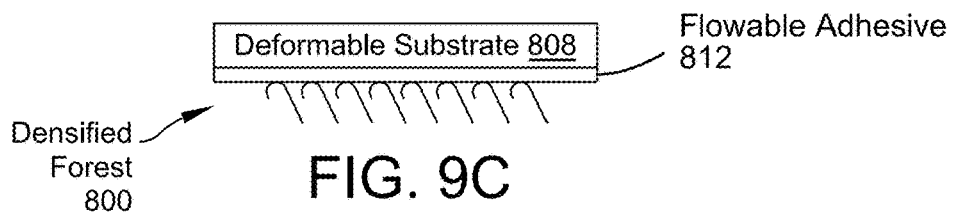

DENSIFYING A NANOFIBER FOREST

RELATED APPLICATIONS

This application claims priority under 35 USC § 119(e) to U.S. Provisional Patent Application No. 62/489,580 entitled "Densifying a Nanofiber Sheet," filed on Apr. 25, 2017, which is incorporated by reference herein in its entirety.

TECHNICAL FIELD

The present disclosure relates generally to nanofibers. Specifically, the present disclosure relates densified nanofiber forests and techniques for densifying nanofiber forests.

BACKGROUND

Nanofiber forests, composed of both single wall and multiwalled nanotubes, can be drawn into nanofiber yarns. The nanofibers yarns exhibit advantageous electrical and mechanical properties. For example, when properly treated, nanofiber yarns have high electrical conductivity, high elastic modulus, and high ultimate tensile strength. At the same time, nanofiber yarns can be twisted, tied, wound, and manipulated like yarns made from more conventional fibers.

SUMMARY

An example of the present disclosure includes a method comprising: providing a deformable substrate having a surface with a starting surface area; attaching a nanofiber forest to the surface of the deformable substrate using a flowable adhesive; and increasing an areal density of the nanofiber forest by deforming the deformable substrate to a second surface area that is less than the starting surface area.

In an embodiment, comprising elastically deforming the deformable substrate from the starting surface area to a first surface area larger than the starting surface area prior to attaching the nanofiber forest.

In an embodiment, wherein increasing the areal density of the nanofiber forest comprises relaxing the deformable substrate from the first surface area to a second surface area that is less than the first surface area.

In an embodiment, further comprising plastically deforming the deformable substrate by applying a stimulus, the deformable substrate shrinking from the starting surface area to the second surface area in response to the applied stimulus.

In an embodiment, wherein the stimulus is heat causing a temperature of the deformable substrate to exceed a glass transition temperature.

In an embodiment, further comprising: applying a layer of flowable adhesive to the substrate; and attaching the nanofiber forest on the surface of the deformable substrate by the flowable adhesive.

In an embodiment that includes the subject matter of any of the preceding embodiments wherein elastically deforming the deformable substrate comprises applying an anisotropic stress to the deformable substrate.

In an embodiment that includes the subject matter of any of the preceding embodiments, further comprising removing the nanofiber forest from the deformable substrate after increasing the areal density of the nanofiber forest.

An example of the present disclosure includes a method comprising: providing an elastically deformable substrate having a surface with a first surface area in a first relaxed state; elastically deforming the elastically deformable substrate to a stretched state in which the surface has a second surface area greater than the first surface area; disposing a nanofiber forest on the surface of the elastically deformable substrate in the stretched state having the second surface area; and increasing an areal density of a nanofiber forest by allowing the elastically deformable substrate to relax into a second relaxed state having a third surface area that is less than the second surface area.

In an embodiment, wherein disposing the nanofiber forest on the surface of the elastically deformable substrate comprises adhering the nanofiber forest to the elastically deformable substrate in the stretched state via a flowable adhesive.

In an embodiment, wherein adhering the nanofiber forest to the elastically deformable substrate further comprises placing one of open ends or tangled ends of nanofibers of the nanofiber forest in contact with the flowable adhesive.

In an embodiment, wherein the flowable adhesive comprises a continuous layer of flowable adhesive in both of the first relaxed state and the stretched state.

In an embodiment, wherein the flowable adhesive is a polymer adhesive in a solvent.

In an embodiment, wherein the flowable adhesive responds to an applied stress by flowing to relax the applied stress.

In an embodiment, the method of any of the preceding claims wherein the surface is planar, cylindrical or spherical.

In an embodiment, wherein disposing the nanofiber forest on the elastically deformable substrate further comprises orienting the nanofiber forest so that a longitudinal axis of a straight portion of nanofibers of the nanofiber forest is approximately perpendicular to a plane of the surface.

In an embodiment, the method of any one of the preceding claims wherein elastically deforming the elastically deformable substrate comprises applying an isotropic stress to the elastically deformable substrate.

In an embodiment, a method of any of the preceding embodiments or examples wherein elastically deforming the deformable substrate comprises applying an anisotropic stress to the elastically deformable substrate.

In an embodiment, a method of any of the preceding embodiments or examples wherein elastically deforming the elastically deformable substrate comprises applying an anisotropic stress to the elastically deformable substrate.

In an embodiment, a method of any of the preceding embodiments or examples s comprising removing the nanofiber forest from the deformable substrate after altering the density of the nanofiber forest.

In an embodiment, wherein the deformable substrate is deformed isotropically and is released anisotropically.

In an embodiment, a method of any of the preceding embodiments or examples wherein the density of the nanofiber forest is more than doubled.

In an embodiment, a method of any of the preceding embodiments or examples wherein the density of the nanofiber forest is increased in an x direction more than in a y direction.

An example of the present disclosure includes a method comprising: providing a deformable substrate having a first surface area in a first state; disposing a layer of flowable adhesive on a surface of the deformable substrate covering the first surface area; disposing a nanofiber forest on the flowable adhesive disposed on the deformable substrate; and increasing an areal density of the nanofiber forest by causing the deformable substrate to contract to a second surface area is a second state, the second surface area less than the first surface area.

In an embodiment, wherein causing the deformable substrate to contract to the second surface area less than the first surface area comprises applying heat to the deformable substrate.

In an embodiment, a carbon nanofiber forest having a nanofiber areal density at least 100% greater than when the forest was grown.

In an embodiment, a carbon nanofiber forest having a nanofiber density that is greater in the x direction than in the y direction.

An example of the present disclosure includes a method comprising: providing a deformable substrate having a surface with a starting surface area; attaching a nanofiber forest to the surface of the deformable substrate using a flowable adhesive; and decreasing an areal density of the nanofiber forest by deforming the deformable substrate to a second surface area that is greater than the starting surface area.

BRIEF DESCRIPTION OF THE DRAWINGS

FIG. 1B' is a plan view SEM image of a tangled portion composed of arcuate portions of individual nanofibers of a carbon nanotube forest, in an embodiment.

FIGS. 8A to 8C are side view schematic illustrations of the plan view of FIG. 7, in an embodiment.

FIGS. 9A to 9C are side view schematic illustrations of a method of aligning nanofibers of a nanofiber forest in a common direction, where the nanofiber forest has been densified using a deformable substrate, in an embodiment.

Figure 1A:
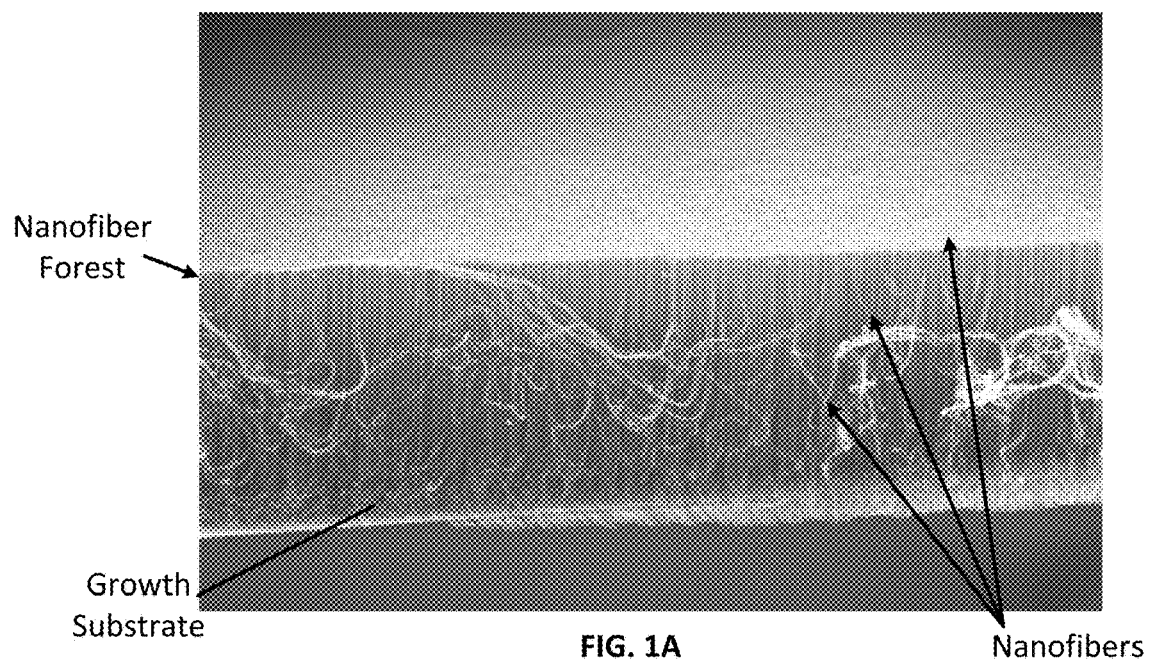
FIG. 1A illustrates an example forest of nanofibers on a substrate, in an embodiment.

The figures depict various embodiments of the present disclosure for purposes of illustration only. Numerous variations, configurations, and other embodiments will be apparent from the following detailed discussion.

DETAILED DESCRIPTION

Overview

Embodiments of the present disclosure include a nanofiber forest that has been processed to increase a number of nanofibers per unit area (referred to as "areal density" or, equivalently, "density") compared to the nanofiber forest in its as-synthesized state. This increase in areal density is accomplished by physically manipulating a deformable substrate on which the nanofiber forest is disposed. At a high level, this physical manipulation begins by transferring the nanofiber forest from a growth substrate to a deformable substrate. The nanofiber forest is attached to the deformable substrate using a flowable adhesive. After attachment of the nanofiber forest, a surface area of the deformable substrate is reduced relative to a surface area of the substrate when the nanofiber forest was attached. This reduction in area causes the nanofibers in the forest to move closer to one another, thus increasing the number of nanofibers per unit area.

One type of deformable substrate is that of an elastically deformable substrate. Examples of materials that can be used to fabricate an elastically deformable substrate include, but are not limited to butadiene rubber, latex, polychloroprene, and blends and copolymers thereof. An elastically deformable substrate can be elastically deformed ("strained" or "stretched") to have an area larger than the area of the substrate in its undeformed state. This stretch can then be released after attachment of the nanofiber forest, returning the substrate to a "relaxed state," and in the process "densifying" the nanofiber forest (i.e., increasing the number of nanofibers per unit area) as a result of the reduction in surface area of the deformable substrate when relaxed. Another example of a deformable substrate is one that shrinks to a smaller surface area in response to a stimulus, such as heat. In an embodiment, a polymer substrate is heated to a temperature proximate to its glass transition temperature, at which point the polymer substrate may contract. Examples of materials used to fabricate this type of plastically deformable substrate include polystyrene, polyethylene, polymers used for "shrink wrap," among others. It will be appreciated that the deformable substrate (whether plastically or elastically deformable) can be deformed isotropically, anisotropically, monodirectionally, bidirectionally, among other types of deformations.

A flowable adhesive is used to adhere the forest to the deformable substrate. The flowable adhesive maintains a planar surface regardless of the state of deformation of the underlying substrate. Using a flowable adhesive prevents discontinuities (e.g., cracks, areas free of adhesive) from forming in the adhesive when the deformable substrate is stretched from a smaller surface area state to a larger surface area state. This property also prevents "buckles" (a surface topology having a sine wave conformation) from forming in the adhesive when the substrate assumes a smaller area state from a larger area state. In other words, the flowable adhesive is in a layer that has a smooth surface and is continuous regardless of the conformation of the underlying substrate.

As mentioned above, once the forest is adhered to the deformable substrate, the substrate is reduced in area. Reducing the surface area of the substrate on which the nanofiber forest is disposed causes the individual nanofibers to move closer to one another, thus increasing the number of nanofibers per unit area. Increasing an areal density of nanofibers has a number of advantages including, but not limited to increasing thermal and electrical conductivity of the "densified" forests. These densified forests can then be used to fabricate nanofiber sheets and nanofibers yarns. The electrical and mechanical properties of the sheets, yarns, and other products reflect the increased nanofiber density of the forest.

Embodiments described herein have a number of distinctions and advantages over various other methods used for densifying nanofibers. For example, while an areal density of nanofiber forest can be influenced during synthesis of the forest itself by tailoring process parameters (e.g., temperature, precursor concentration/flow rate, catalyst type and density of the catalyst on a substrate), the individual fibers of the forest are still often spatially separated from one another. Other conventional techniques for reducing the spaces between individual nanofibers are usually applied to nanofiber sheets or yarns that have been produced from a forest, and are not applied to a nanofiber forest itself. For example, nanofiber sheets that have been drawn from a nanofiber forest, can be densified by applying a solvent to the sheet and allowing the solvent to evaporate. Another technique involves mechanically compacting the sheet (e.g., squeezing, rolling, pressing). However, embodiments of the present disclosure can increase nanofiber density beyond processes performed only on a sheet or a yarn, and can be performed on the forest itself. In some cases, a forest may be used in a technological application rather than a nanofiber sheet or yarn and techniques to densify the forest can improve performance of the application as a whole.

A description of nanofiber fabrication, nanofiber forest fabrication, and nanofiber sheet fabrication precedes a description of forest densification techniques.

Nanofiber Forests

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be densified using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 2 and 3, respectively.

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1A shows an example forest of nanofibers on a substrate. The substrate may be any shape but in some embodiments the substrate has a planar surface on which the forest is assembled. As can be seen in FIG. 1A, the nanofibers in the forest may be approximately equal in height and/or diameter.

Figure 1B:
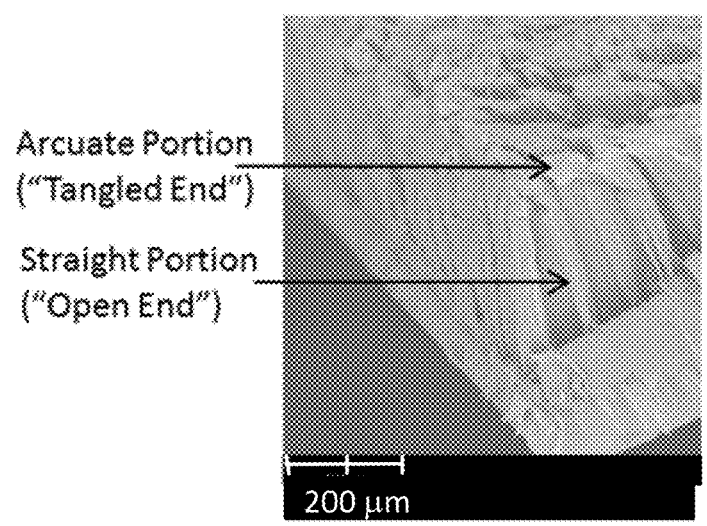
FIG. 1B is a perspective view scanning electron microscope (SEM) image of a carbon nanotube forest (alternatively referred to herein as a "layer") having a plurality of individual nanotubes, each of which includes a straight portion and an arcuate portion, in an embodiment.
Figure 1B:
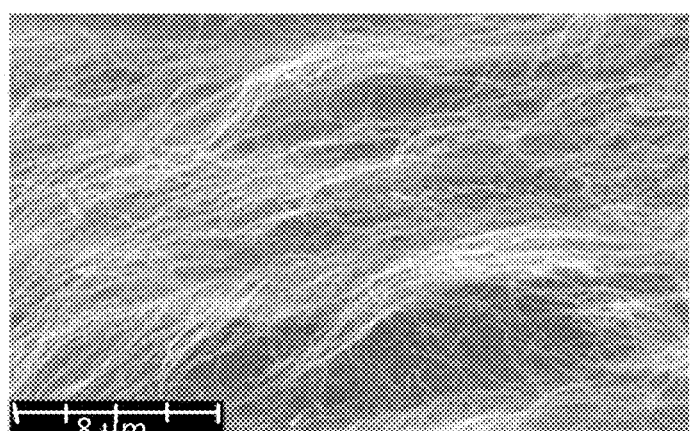

Some embodiments of nanofiber forests include nanofibers that have two portions in their as-deposited form. With reference to FIGS. 1B and 1B', one portion is a "straight portion" (that terminates in an "open end") that connects to, and is disposed near, a growth substrate. The other portion is "an arcuate portion" (also sometimes referred to as a "tangled end") that is disposed at an exposed surface of the nanofiber layer and that bends away from a longitudinal axis of the straight portion. These ends are indicated in the scanning electron microscope (SEM) image of FIG. 1B taken at a magnification of approximately 300× and an accelerating voltage of 10 kV. FIG. 1B' is a top view of a nanofiber layer and shows the tangled nature of the arcuate portions.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Various methods can be used to produce nanofiber precursor forests. For example, in some embodiments nanofibers may be grown in a high-temperature furnace. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, SiO$_2$, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

The reaction conditions during nanofiber growth can be altered to adjust the properties of the resulting nanofiber precursor forest. For example, particle size of the catalyst, reaction temperature, gas flow rate and/or the reaction time can be adjusted as needed to produce a nanofiber forest having the desired specifications. In some embodiments, the position of catalyst on the substrate is controlled to form a nanofiber forest having desired patterning. For example, in some embodiments catalyst is deposited on the substrate in a pattern and the resulting forest grown from the patterned catalyst is similarly patterned. Example catalysts include iron with a, buffer layer of silicon oxide (SiO$_2$) or aluminum oxide (Al$_2$O$_3$). These may be deposited on the substrate using chemical vapor deposition (CVD), pressure assisted chemical vapor deposition (PCVD), electron beam (eBeam) deposition, sputtering, atomic layer deposition (ALD), plasma enhanced chemical vapor deposition (PECVD), among others.

Figure 5A:
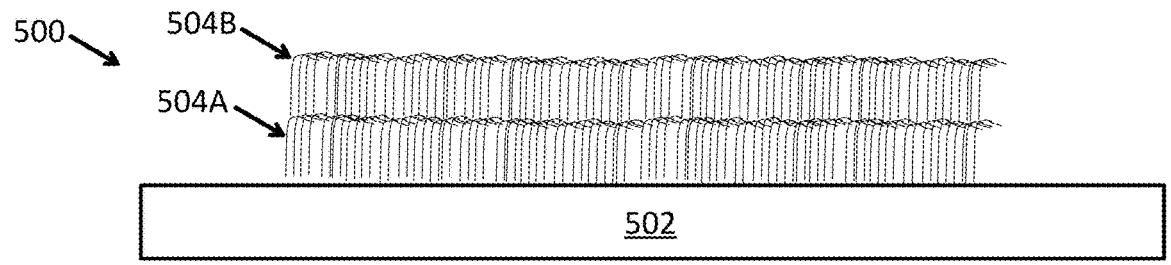
FIGS. 5A to 5F schematically illustrate the nanofiber sheet at various stages of fabrication, in embodiments.

In some particular embodiments, multiple nanofiber precursor forests may be sequentially grown on the same substrate to form a multilayered nanofiber precursor forest, alternatively referred to as a "stack." An example multi-layered nanofiber precursor forest is schematically shown in FIG. 5A.

In a process used to fabricate the structure illustrated in FIG. 5A, one nanofiber precursor forest is formed on a substrate followed by the growth of a second nanofiber precursor forest in contact with the first nanofiber forest. Multi-layered nanofiber precursor forests can be formed by numerous suitable methods, such as by forming a first nanofiber precursor forest on the substrate, depositing catalyst on the first nanofiber precursor forest and then introducing additional fuel compound to the reactor to encourage growth of a second nanofiber precursor forest from the catalyst positioned on the first nanofiber forest. Depending on the growth methodology applied, the type of catalyst, and the location of the catalyst, the second nanofiber precursor layer may either grow on top of the first nanofiber precursor layer or, after refreshing the catalyst, for example with hydrogen gas, grow directly on the substrate thus growing under the first nanofiber precursor layer. Regardless, the second nanofiber precursor forest can be aligned approximately end-to-end with the nanofibers of the first nanofiber precursor forest although there is a readily detectable interface between the first and second precursor forest. Multi-layered nanofiber precursor forests may include any number of forests. For example, a multi-layered precursor forest may include two, three, four, five or more forests.

Nanofiber Sheets

Figure 2:
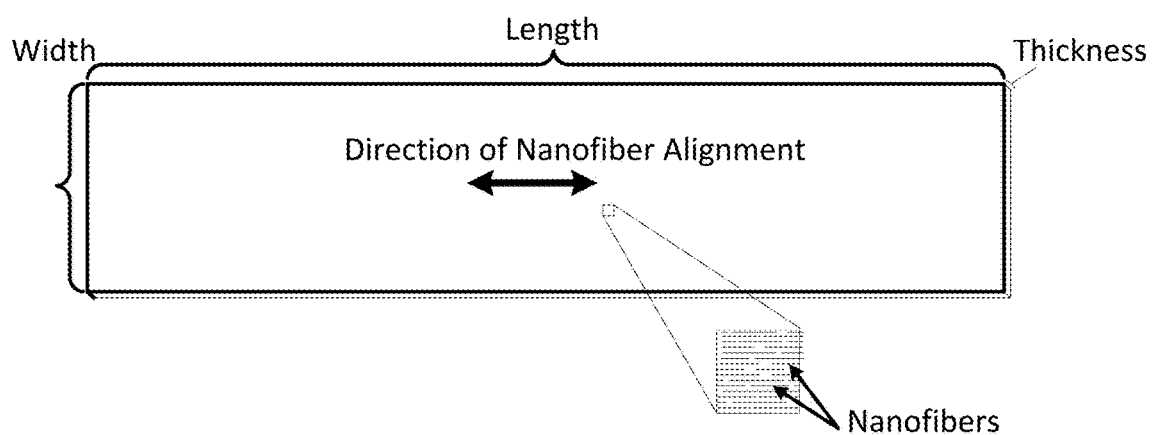
FIG. 2 is an illustration of a nanofiber sheet that identifies relative dimensions of the sheet and schematically illustrates nanofibers within the sheet aligned end-to-end in a plane parallel to a surface of the sheet, in an embodiment.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 2 with relative dimensions illustrated. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 μm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 2, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be stacked on top of one another to form a multi-layered sheet stack. Nanofiber sheets may be stacked to have the same direction of nanofiber alignment or to have different directions of nanofiber alignment. Any number of nanofiber sheets may be stacked on top of one another to form a multi-layered nanofiber sheet stack. For example, in some embodiments, a nanofiber sheet stack may include 2, 3, 4, 5, 10, or more individual nanofiber sheets. The direction of nanofiber alignment between adjoining sheets in a stack may differ by less than 1°, less than 5° or less than 10°. In other embodiments, the direction of nanofiber alignment between adjoining or interleaved sheets may differ by more than 40°, more than 45°, more than 60°, more than 80°, or more than 85°. In specific embodiments, the direction of nanofiber alignment between adjoining or interleaved sheets may be 90°. Multi-layer sheet stacks may include other materials such as polymers, metals and adhesives in between individual nonfiber sheets.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 3.

Figure 3:
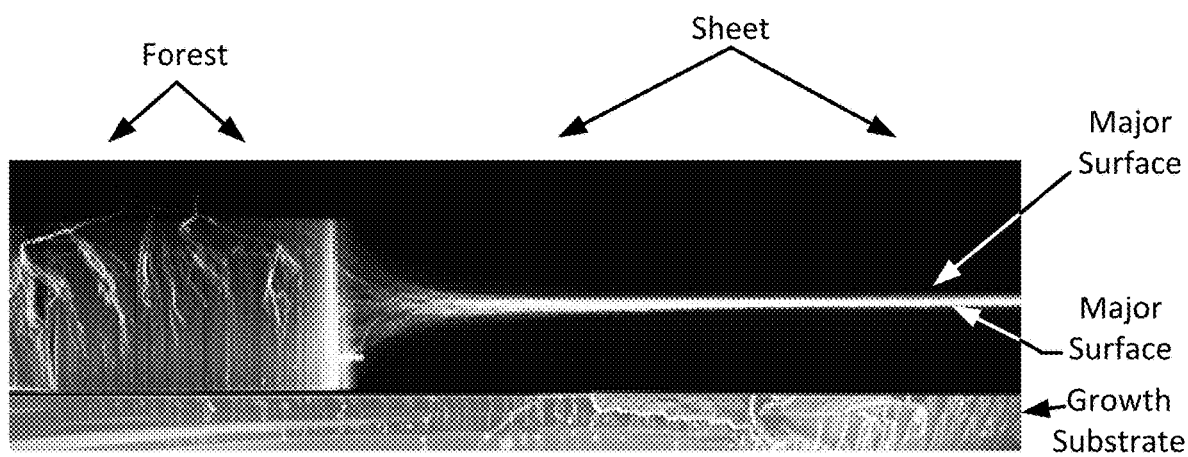
FIG. 3 is an image of a nanofiber sheet being laterally drawn from a nanofiber forest, the nanofibers aligning from end-to-end as schematically shown in FIG. 2.

As can be seen in FIG. 3, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Transferring a Nanofiber Forest to a Deformable Substrate

It can be difficult to transfer a nanofiber forest from a growth substrate to another substrate without damaging the forest and thus compromising the properties of the forest. While not required to practice techniques for densifying a forest as described herein, an example method for conveniently transferring a nanofiber forest to a deformable substrate is show in FIG. 4 as method 400 and described below. This example method 400 (also described in U.S. patent application Ser. No. 15/800,882, which is incorporated by reference herein in its entirety) can transfer a forest without damaging it (i.e., changing a structure so as to reduce nanofiber density and/or reduce the electrical or thermal properties of the forest, or otherwise reducing its ability to be drawn into a sheet or spun into a yarn). Schematic illustrations of some of the stages of the method 400 appear in FIGS. 5A to 5F to facilitate explanation of the method 400.

The method 400 begins with providing 404 a precursor carbon nanofiber stack having at least two distinct layers (or "forests") of nanofibers. Fabricating the nanofiber stack is disclosed in, for example, PCT Patent Application Publication No. WO2007/015710, which is incorporated by reference herein in its entirety. As used herein, a forest (or a layer) of nanofibers or carbon nanotubes refers to an array of nanofibers having approximately equivalent dimensions that are arranged substantially parallel (i.e., +/−5°) to one another on a substrate where a longitudinal axis of at least 90% of the nanofibers is substantially perpendicular (i.e., +/−) 5° to a surface of the substrate on which the nanofibers are disposed.

In some embodiments, the nanofibers of the precursor forest may each be oriented with respect to a growth surface of the substrate at a common angle that is greater than or less than 90°. For example, the nanofibers of the precursor forest may be angled between 45° and 135° in relation to the surface of the substrate. In particular embodiments, the nanofibers of the forest may be oriented between 75° and 105° from the surface of the substrate and in select embodiments the nanofibers may be oriented approximately 90° from the substrate.

This process of fabricating a forest is repeated at least once (with an intervening air and/or hydrogen reduction step to chemically reduce the catalyst) to synthesize and ultimately provide 404 the nanotube stack having at least two layers of aligned nanofibers. An illustration of an embodiment of a two layer nanofiber forest 500 is shown in FIG. 5A. As shown in FIG. 5A, a nanofiber layer 504A is disposed on a growth substrate 502 (which can be fabricated from stainless steel). Nanofiber layer 504B is disposed on a surface of arcuate portions of nanofibers of the nanofiber layer 504A. As is shown, this surface of arcuate portions of the layer 504A is at a surface of the nanofiber layer 504A that is opposite the growth substrate 502. This configuration is consistent with the preceding explanation of nanofiber layers in their as-deposited state.

Figure 5B:
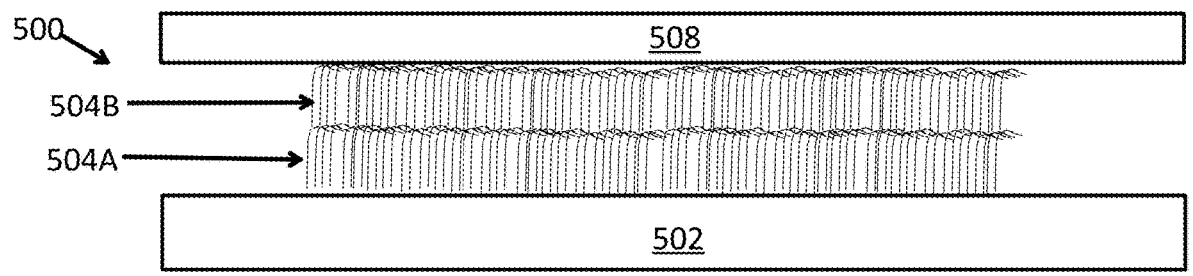

Having thus fabricated the two layer nanofiber forest 500 on the growth substrate 502, FIG. 5B illustrates a deformable substrate 508 that is applied 408 to the exposed surface of the nanofiber layer 504B. The elastically deformable substrate 508 as it is applied has a first surface area. However, as will be described below, this first surface area is ultimately reduced to a second surface area less than the first surface area, thus increasing a density of the nanofibers per unit area that are attached to the deformable substrate 508. As will also be explained below, the deformable substrate 508 includes a flowable adhesive. The flowable adhesive maintains a planar surface regardless of the state of deformation state of the deformable substrate 508. This prevents discontinuities from forming (e.g., areas lacking in adhesive) when the deformable substrate 508 is stretched and also prevents buckling of the adhesive when the deformable substrate is relaxed or reduced in area.

As described elsewhere, the adhesive strength of the deformable substrate 508 can be greater than that of a replacement substrate optionally used to replace the growth substrate 502. As described in U.S. Patent Appl. No. 62/348,423 (incorporated by reference herein in its entirety), this relative difference in adhesive strengths between the deformable substrate 508 and the replacement substrate (e.g., substrate 520 described below) that influences a common direction that the nanofibers are ultimately oriented in relative to the surface of the deformable substrate 508 and a growth substrate 502 (or a replacement adhesive substrate).

In examples, the adhesive strength of the deformable substrate 508 is, when measured using a 180° peel adhesion test (sold by CHEMINSTRUMENTS® of West Chester, Ohio) in the range of 2 N/25 mm to 4 N/25 mm when pulled at a rate of 5 mm/second, after having let the deformable substrate 508 remain in contact with the exposed surface of the layer 404B for approximately 30 minutes (to facilitate bonding). In other examples, the range of adhesive strength is in the range of 2 N/25 mm to 3 N/25 mm, 3 N/25 mm to 4 N/25 mm, or 2.5 N/25 mm to 3.5 N/25 mm.

Figure 4:
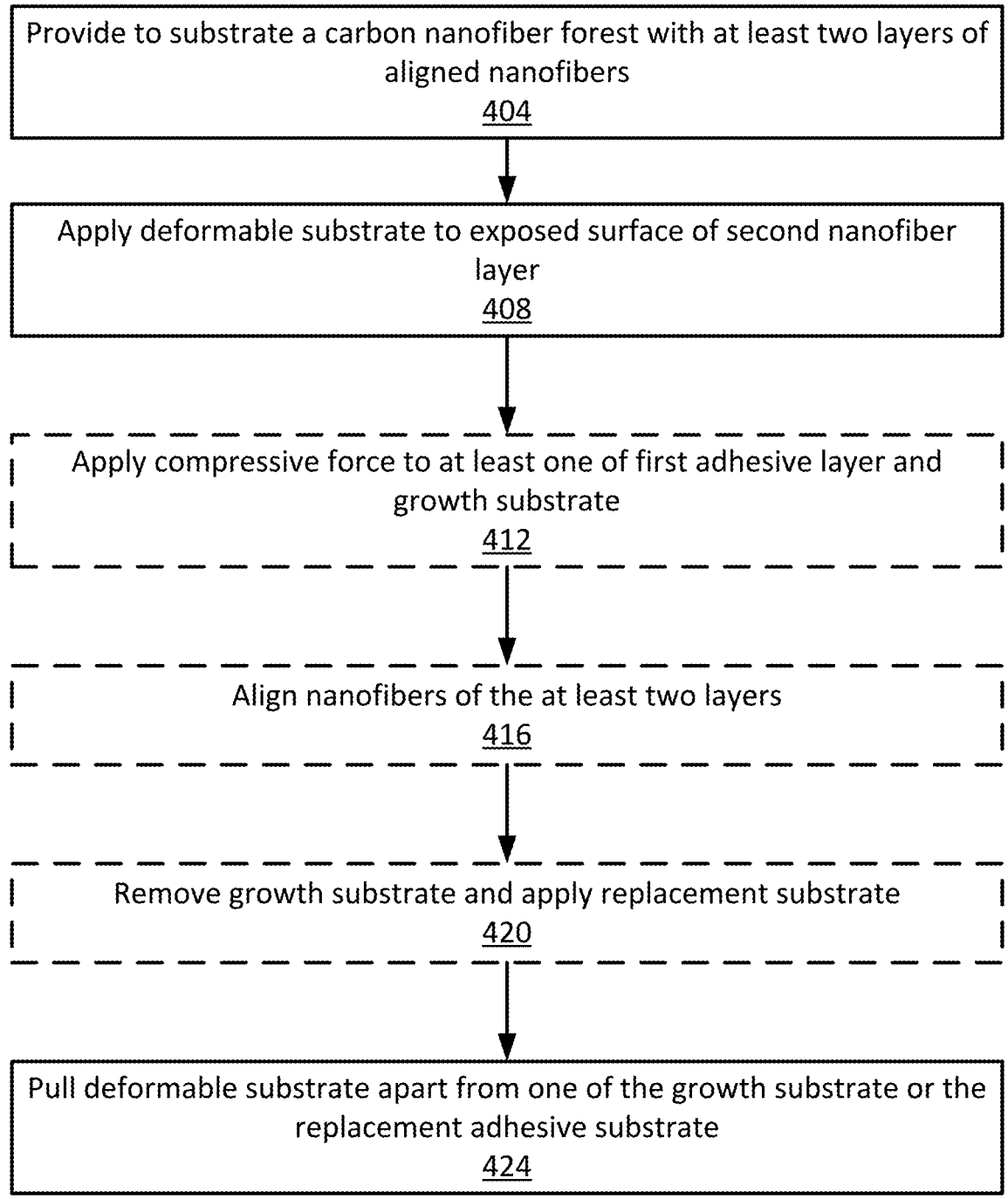
FIG. 4 is a method flow diagram for a method of fabricating a nanofiber sheet of the present disclosure, in an embodiment.

Optionally, the deformable substrate 508 can be pulled apart from 424 one of the growth substrate 502 omitting elements shown in FIG. 4 for aligning the nanofibers in a common direction. This would produce one forest adhered to the deformable substrate 508 and one forest adhered to the growth substrate 502. The forest adhered to the deformable substrate 508 could then be densified as described below in the context of FIGS. 6 to 9F. However, for completeness of explanation, optional elements of the method 400 for aligning nanofibers within a forest are described in the context of FIGS. 5C to 5F.

Figure 5C:
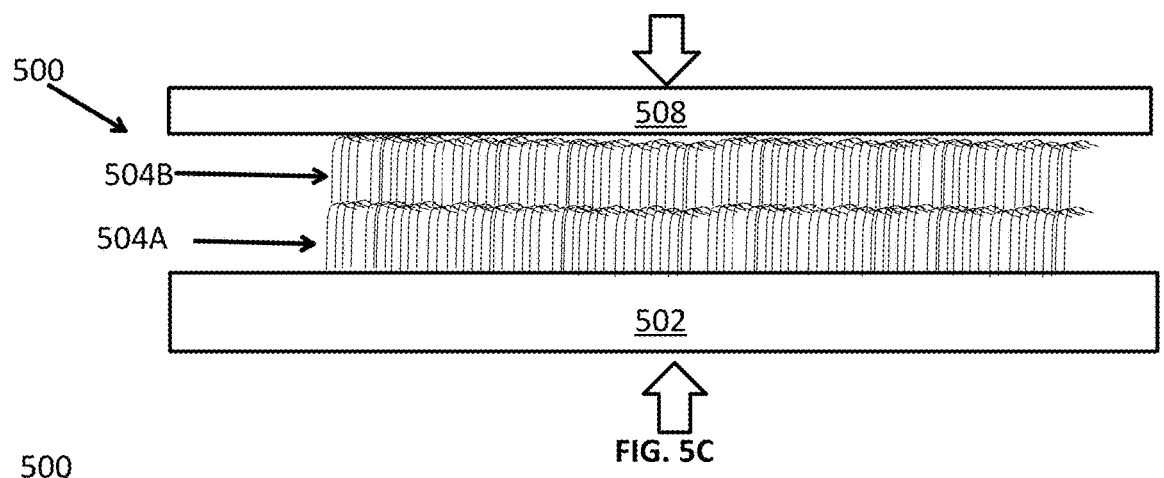
Figure 5C:
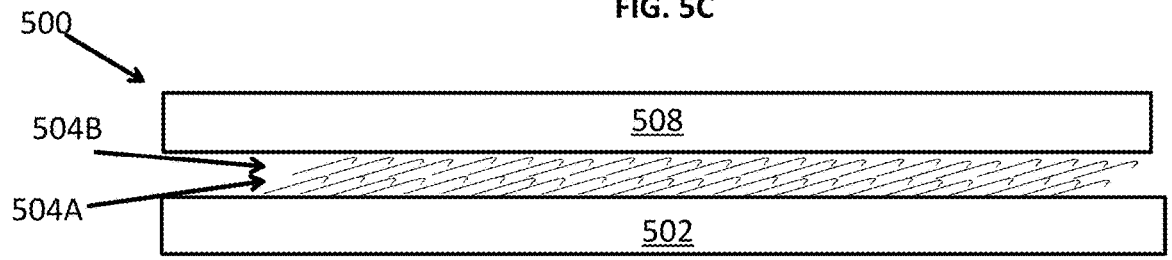

As shown in FIG. 5C, a compressive force is optionally applied 412 to one or both of the growth substrate 502 and the deformable substrate 508. While FIG. 5C illustrates a normal force applied 512 both of the growth substrate 502 and the deformable substrate 508, it will be understood that forces can be applied 512 via a non-normal vector by, for example, a roller (or rollers), plates, or other mechanisms that squeeze the growth substrate 502 and the deformable substrate 508 together. Furthermore, it will be understood that while a normal force is shown in FIG. 5C, the applied force can include both normal and shear components so that the individual nanofibers of each of the layers 504A and 504B (and others in embodiments with three or more nanofiber forest layers). Applying a force can reorient nanofibers from an as-grown orientation, in which a longitudinal axis of the individual fibers is typically perpendicular to a surface of a growth substrate, to an orientation in which the longitudinal axis of the fibers is at an acute angle to or parallel with the surface of the growth substrate 502. During such a procedure, the distance between opposing substrates 502 and 508 can decrease by at least 20%, at least 30%, at least 40%, at least 50%, or at least 70%.

Regardless of the mechanism by which a force is applied 412 or the relative magnitudes of compressive and shear components of the applied 412 force, the compressive force has the effect of optionally aligning 416 the nanofibers of both layers in a common direction. One example of this is shown schematically in FIG. 5C', in which the applied 412 compressive force has aligned some or all of the individual fibers of both of the nanofiber layers 504A and 504B at an acute angle with respect to a plane of a surface of the growth substrate 502. The precise value of the acute angle at which the nanofibers of the layers 504A and 504B are disposed with respect to the surface of the growth substrate is immaterial except that it should be a lower value (i.e., closer to 0° or in other words, more parallel to the surface of the growth substrate 502) than the ultimately desired orientation of the fibers in the final nanofiber sheet.

Figure 5D:
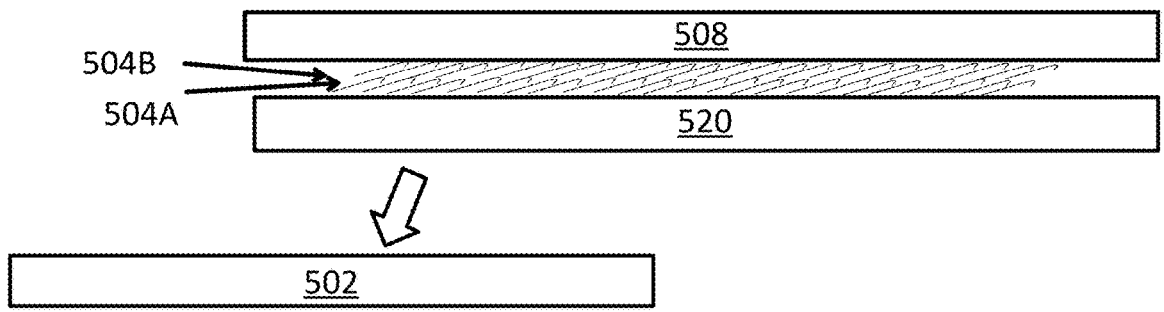

As illustrated in FIG. 5D, the growth substrate 502 is optionally removed 420 and a replacement substrate 520 is applied 420 to the surface of the first nanofiber layer 504A exposed by removal of the growth substrate 502. The adhesive strength of the replacement substrate 520 is selected according to an orientation of the nanofibers desired for the final nanofiber sheet. For example, a replacement substrate 520 having an adhesive strength less than that of the deformable substrate 508 but in the range of 0.1 N/25 mm to 0.5 N/25 mm will adhere to the nanofibers of the layers 504A and 504B so that the fibers, at the adhesion breaking point, are pulled approximately perpendicular to the surfaces of the deformable substrate 508 and replacement substrate 520. Other ranges of adhesive strengths will also facilitate this orientation, including from 0.1 N/25 mm to 0.4 N/25 mm, from 0.1 N/25 mm to 0.2 N/25 mm, from 0.2 N/25 mm to 0.3 N/25 mm, from 0.2 n/25 mm to 0.4 N/25 mm, and from 0.3 n/25 mm to 0.5 N/25 mm. It will be appreciated that while an upper limit of 0.5 N/25 mm is described, adhesives with even higher adhesive strengths can be used. As will be explained below in more detail, it is the relative strength between the adhesive of the deformable substrate relative to the adhesive of the replacement substrate that determines the orientation of the fibers after separating the two adhesive substrates.

In another example, the replacement substrate 520 having an adhesive strength that is an order of magnitude lower than those described above will facilitate orientation of the fibers at an acute angle greater than the angle achieved after the compressive force is applied (as shown in FIG. 5C') but less than the perpendicular configuration described immediately above. For example, adhesive strengths in the range of 0.01 N/25 mm to 0.05 N/25 mm will produce this orientation of nanofibers in the sheet. Other ranges of adhesive strengths appropriate for this orientation include 0.01 N/25 mm to 0.02 N/25 mm, 0.01 N/25 mm to 0.04 N/25 mm, and 0.02 N/25 mm to 0.03 N/25 mm.

Because it is the relative strength of the adhesives that determines the orientation of the nanofibers, the adhesive strength of the deformable substrate 508 and the replacement substrate 520 can be selected based on their relative strengths. For example, a ratio of an adhesive strength of the deformable substrate 508 compared to the replacement substrate 520 can be in a range from 4:1 to 400:1. The orientation of the fibers for different ratios is understood based on the descriptions presented above.

Figure 5E:
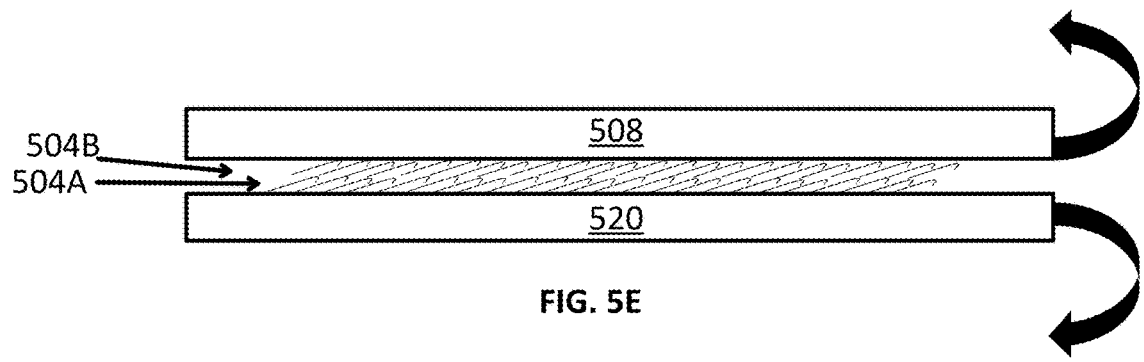

As shown in FIG. 5E, the deformable substrate 508 and the replacement substrate 520 are pulled apart 424, as indicated by the arrows in FIG. 5E. Pulling apart 520 the deformable substrate 508 and the replacement substrate 520 exposes the straight portion of the nanofibers of the second nanofiber layer 508B. As indicated above in the context of FIG. 5D, the adhesive strength of the replacement substrate changes the angle with which the individual nanofibers of the layers are oriented (with respect to a corresponding underlying substrate) after the two layers are pulled apart 424.

Figure 5F:
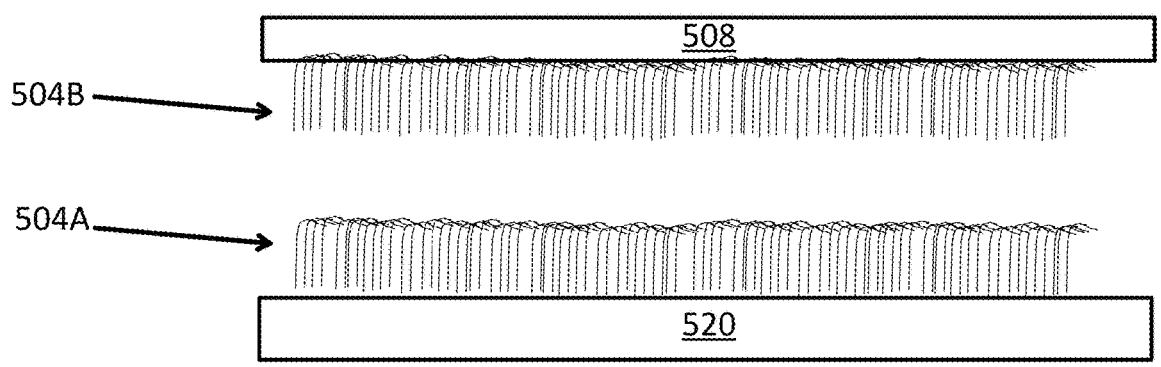

FIG. 5F illustrates one embodiment in which an adhesive strength of the replacement substrate 508 is in the range of, for example, 0.1 N/25 mm to 0.5 N/2 5 mm, as described above. As indicated above, a substrate having an adhesive strength in this range separates the nanofiber layer 504B from the nanofiber layer 504A, while also providing enough adhesive strength to re-orient the individual nanofibers from a "flattened" orientation (as shown in FIG. 5D) to an orientation in which the nanofibers are approximately perpendicular to a surface of the substrates 508 and 520. This has the effect of exposing the straight ends of the individual nanofibers of the layer 504A. The surface of the layer 504A composed of arcuate ends of individual nanofibers is exposed also. In this embodiment, the adhesive strength of each of the substrates is greater than then adhesive strength that binds the two nanofiber layers together.

Increasing Nanofiber Forest Density

Figure 6:
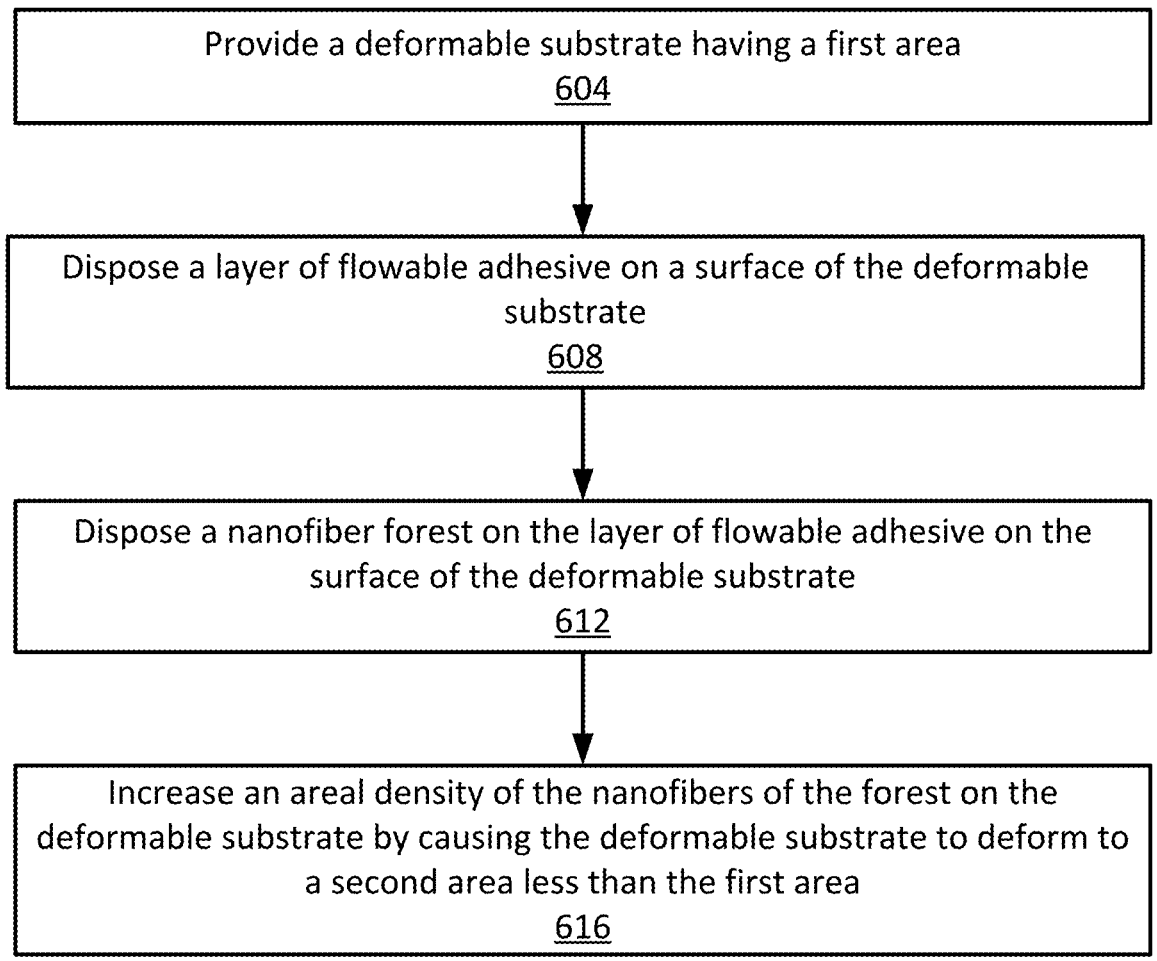
FIG. 6 is a method flow diagram for increasing a density of nanofibers of a nanofiber forest on a deformable substrate, in an embodiment.

FIG. 6 illustrates an example method 600 for increasing density of nanofibers on a nanofiber substrate. Elements of the example method 600 are schematically illustrated in FIGS. 7 to 10F. Concurrent reference to FIG. 6 and FIGS. 7 to 10F will facilitate explanation of various techniques of the method 600.

It will be appreciated that nanofiber areal density of a forest can be increased using embodiments described herein by at least 100% compared to the areal density of the nanofiber forest in its as-grown state. The extent of density increase can be a function of a starting density of the nanofiber forest initially disposed on a deformable substrate, the extent to which a deformable substrate is deformed prior to attaching a nanofiber forest on a surface of the deformable substrate when in a stretched state, and a number of times a nanofiber forest is densified using a deformable substrate. In one example, a nanofiber forest can be grown so that the individual nanofibers collectively occupy from 2% to 5% of total substrate surface area. This collective occupation of the surface area is determined by multiplying a cross-sectional area of each nanofiber by an estimated number of nanofibers on the substrate and dividing the product by the surface area of the substrate. For this example nanofiber forest, an increase in density of the nanofiber can unexpectedly be as high as 500%, or more, after a single iteration of the densification methods described herein. In another example, a nanofiber forest can be grown so that the individual nanofiber collectively occupy from 10% to 25% of total substrate surface area. In this case, an increase in density of the nanofiber forest can be from 100% to 300% so that the nanofibers of the forest collectively occupy from 30% to 75% of the total substrate area after a single iteration of the densification methods described herein.

The method 600 begins by providing 604 a deformable substrate 700 having a first surface area. As shown in plan view in FIG. 7, the deformable substrate 700 is an isotropically elastic substrate, examples of which include latex, butadiene rubber, among others. It will be understood that the example shown in FIG. 7 has been selected for convenience of explanation only. While the example of substrate 700 illustrated in FIG. 7 is that of a planar configuration, it will be appreciated that other embodiments of the substrate 700 include those will cylindrical or spherical surfaces.

In this example, the first surface area of the deformable substrate 700 is denoted by dimensions α and β. The values of α and β are immaterial and are provided only as a reference to illustrate example changes in the dimensions of the deformable substrate 700 caused by deformation.

The method 600 continues by disposing 608 a layer of flowable adhesive 708 on the surface of the deformable substrate 700. The flowable adhesive is formulated so as to maintain a planar surface regardless of the state of deformation of the substrate, as described above. Examples of the flowable adhesive 708 include, but are not limited to polymers and/or adhesives in solvents that flow like liquids. Other examples of the flowable adhesive 708 include viscoelastic polymers and/or adhesives for which viscous (rather than elastic) behavior dominates in the strains and strain rate regimes applied to the underlying deformable substrate 700.

Figure 7:
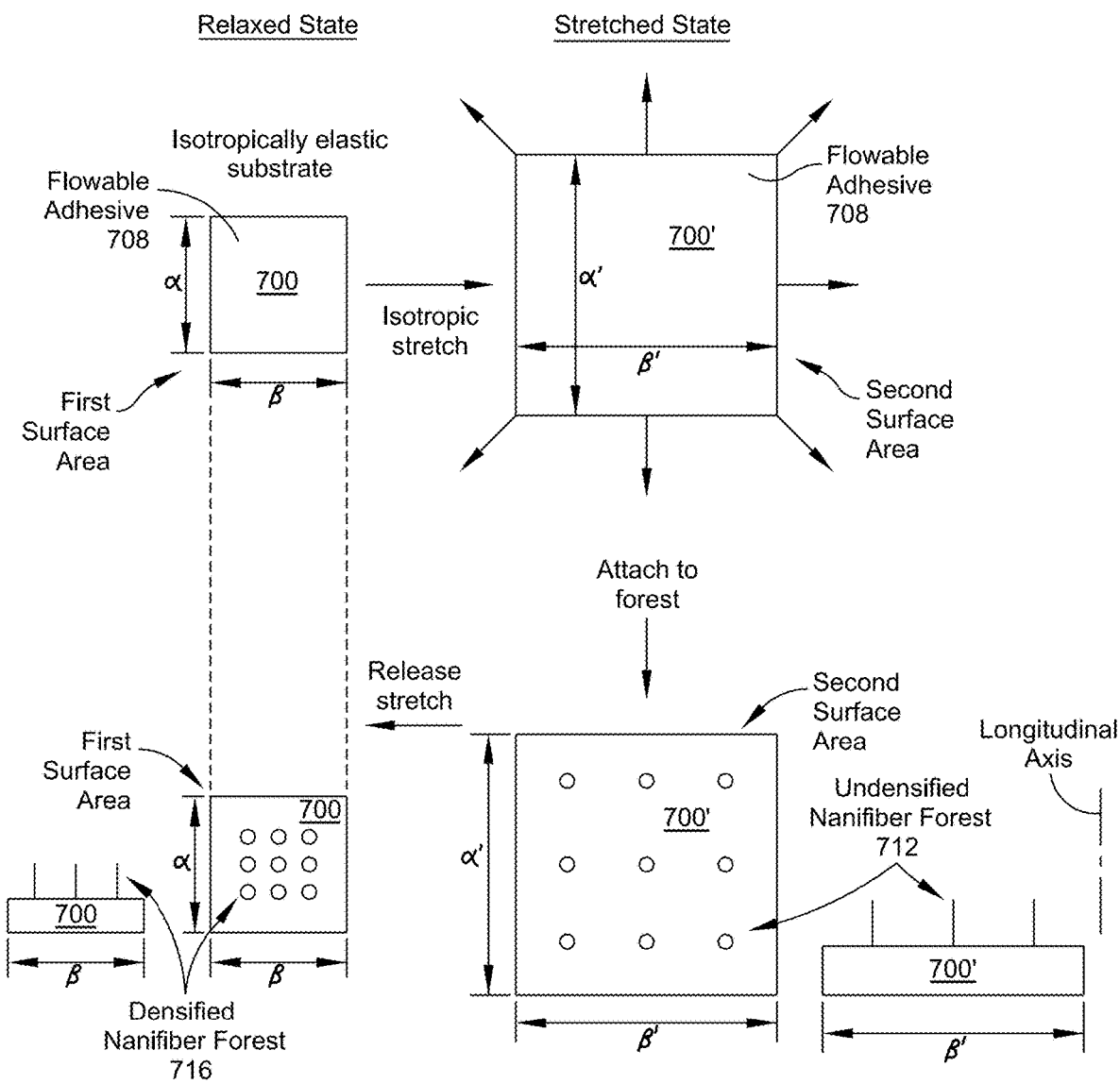
FIG. 7 is a schematic plan view illustration of a deformable substrate deformed to increase a density of nanofibers disposed on the substrate, in an embodiment.

In the example shown in FIG. 7, the deformable substrate 700 is isotropically stretched to a stretched state (denoted as 700') having a second surface area that is greater than the first surface area in the relaxed state. The second surface area is denoted by dimensions α' and β'. In the example of FIG. 7, α' is greater than α, and β' is greater than β, thus producing a second surface area in the stretched state of α'×β' that is greater than the first surface area. It will be appreciated that isotropic stretching is not necessary, and that anisotropic stretching can also be used to densify a nanofiber forest. In still other examples described below, the deformable substrate is not stretched, but rather shrunk to densify the nanofiber forest.

An undensified nanofiber forest 712 is then disposed 612 on the flowable adhesive covering the second surface area of the stretched deformable substrate 700'. The undensified nanofiber forest 712 can be disposed 612 on the stretched deformable substrate 700' using any of the techniques described above in the context of FIGS. 4-5F. The flowable adhesive adheres the forest to the substrate 700'.

The areal density of the nanofiber forest 712 is then increased 616 by releasing the stretch of the deformable substrate 700. As described above, and shown in FIG. 7, releasing the stretch of the deformed substrate 700 (in this example, allowing the substrate 700 to return to a relaxed state having dimensions α and β) increases the number of nanofibers per unit area of substrate. Not only does the area of the substrate itself decrease, but also the distance between the individual nanofibers of the forest. The densified nanofiber forest 716 is shown schematically in FIG. 7.

While the embodiment shown in FIG. 7 illustrates isotropic expansion of the substrate 700, it will be appreciated that a substrate can be deformed isotropically or anisotropically. For example, in the case of a planar and rectangular substrate, the substrate can be deformed (whether before or after attachment of the forest to the substrate) more in an x-direction than in a y-direction. This leads to a nanofiber density that is greater in the x-direction than in the y-direction. Other anisotropic deformations will lead to corresponding anisotropic densities of the nanofiber forest.

FIGS. 8A to 8C are side view schematic illustrations of the method 600 described above.

As shown in FIG. 8A, a nanofiber forest 800 is formed on a growth substrate 804. A deformable substrate 808 that includes a flowable adhesive 812 is attached to an exposed surface of the nanofiber forest 800. While only a single layer forest 800 is shown here, it will be appreciated that this is for convenience of illustration only. The single layer nanofiber forest 800 may be a multiple forest stack, as described above, without departing from the concepts described herein.

FIG. 8B illustrates a deformable substrate 808 attached to an exposed surface of the nanofiber forest 800 via flowable adhesive 812. The deformable substrate 808 shown in FIG. 8B has a first surface area. In the illustrations of FIGS. 8A to 8C, the deformable substrate 808 can be either elastically deformable or plastically deformable (i.e., reduce its surface area irreversibly in response to a stimulus, like heat). While example materials of both elastically deformable substrates and plastically deformable substrates are described above, it will be appreciated that regardless of the material or the mechanism of deformation, the deformable substrate decreases its surface area and thus decreases the inter-fiber spacing of nanofibers in a nanofiber forest 800 attached thereto.

FIG. 8C illustrates the deformable substrate 808 in a deformed state having a second surface area that is less than the first surface area. To illustrate this point, the reduced size of the deformed state relative to the undeformed state is highlighted using dashed lines in FIG. 8B indicating the undeformed size relative to the deformed size. The inter-fiber spacing of the densified forest 800 is also less than the inter-fiber spacing of the forest prior to deformation of the substrate 808.

It will also be appreciated that the reduction in the inter-fiber spacing after deformation need not be uniform across the substrate 808. Rather, the inter-fiber spacing can be reduced inhomogenously across the substrate.

FIGS. 9A to 9C illustrate side views of a densified nanofiber forest, the nanofibers of which have been optionally aligned according to the optional elements 412 to 420 shown in FIG. 4 and described in more detail in U.S. Patent Appl. No. 62/348,423. Continuing with the example depicted in FIGS. 8A and 8B, the growth substrate 804 remains in place or is replacement with a replacement adhesive substrate 900. Regardless of the substrate, a compressive force is applied to the two substrates 808, 804 or 900, thus aligning the nanofibers of the forest 800 in a common direction having an angle Θ with one of the growth substrate 804 or the replacement adhesive substrate 900.

The two substrates are then pulled apart using a "separating force." As described above and in U.S. patent application Ser. No. 15/800,882, the resulting angle Θ' of the exposed nanofiber forest 800 is a function of the relative adhesive strengths of the flowable adhesive 812 and the growth substrate 804 or the replacement adhesive substrate 900.

It will be appreciated that the forest of FIGS. 9A to 9C (and indeed, any of the example embodiments described herein) can be densified either before or after the nanofibers are aligned in a common direction.

Figure 10A:
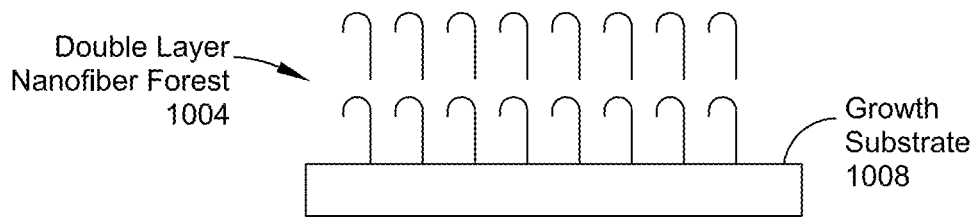
FIGS. 10A to 10F are side view schematic illustrations of a method of aligning nanofibers of a two layer stack of nanofiber forests in a common direction, wherein at least one of the nanofiber forests has been densified using a deformable substrate, in an embodiment.

FIGS. 10A to 10E schematically illustrate side views of stages in a process of densifying a nanofiber forest, similar to the process shown in FIGS. 9A to 9C. The primary difference, as shown in FIG. 10A, is that cross-sections depicted in FIGS. 10A to 10E include a double layer nanofiber forest stack.

Figure 10B:
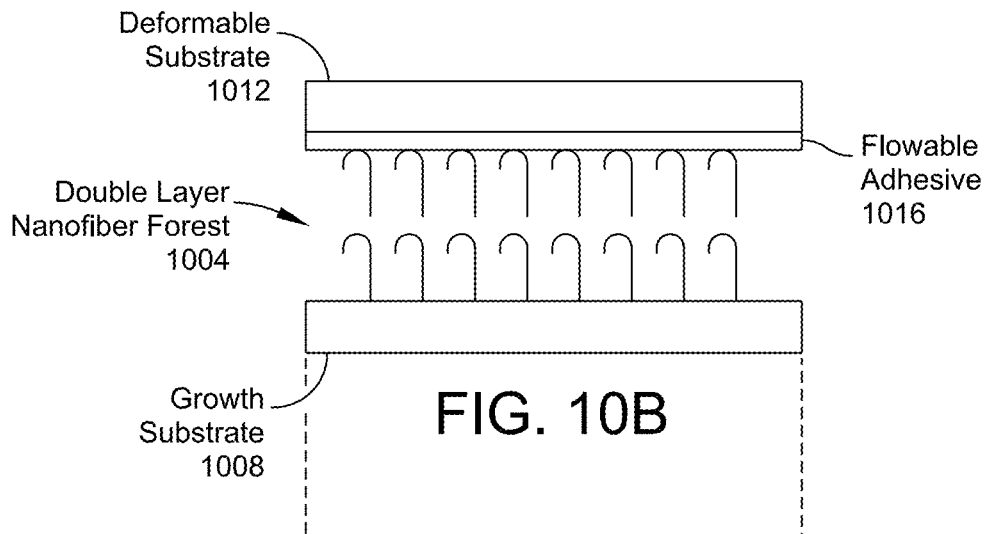

Analogous to the preceding description, a double layer nanofiber forest 1004 is fabricated on a growth substrate 1008. As shown in FIG. 10B, a deformable substrate 1012 is attached to an exposed surface of the double layer nanofiber forest 1004 via a flowable adhesive 1016.

Figure 10C:
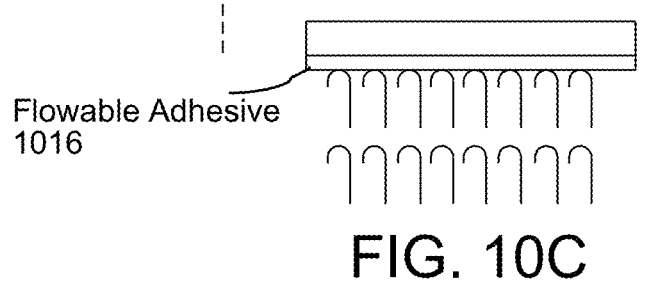

In one alternative embodiment illustrated in FIG. 10C, the growth substrate 1008 is removed and a surface area of the deformable substrate 1012 is reduced or allowed to shrink, thus densifying the double layer nanofiber forest 1004.

Figure 10D:
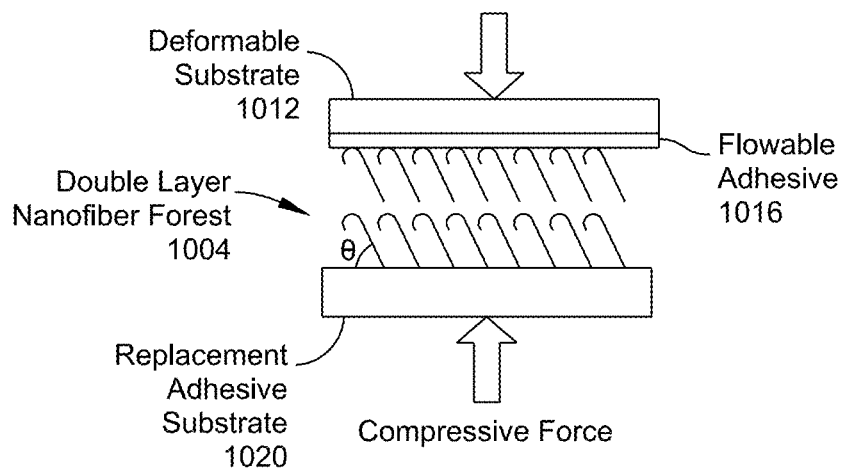
Figure 10E:
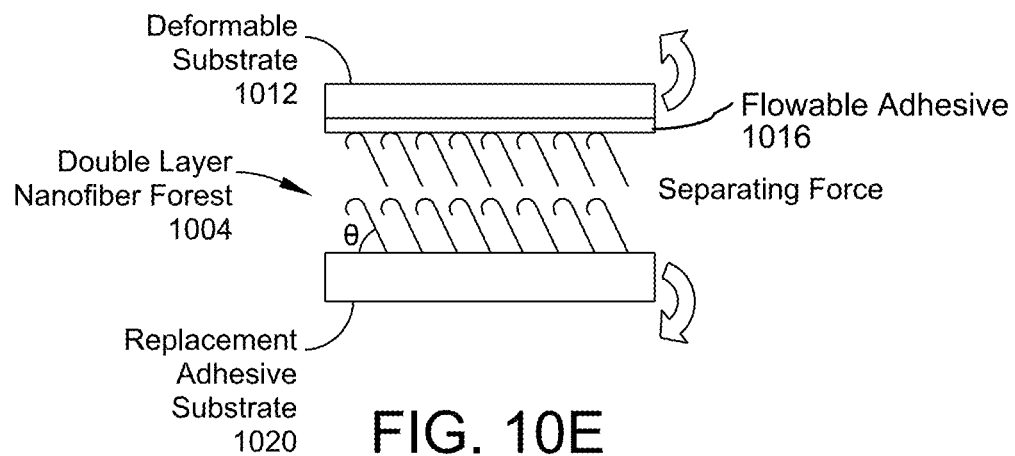
Figure 10F:
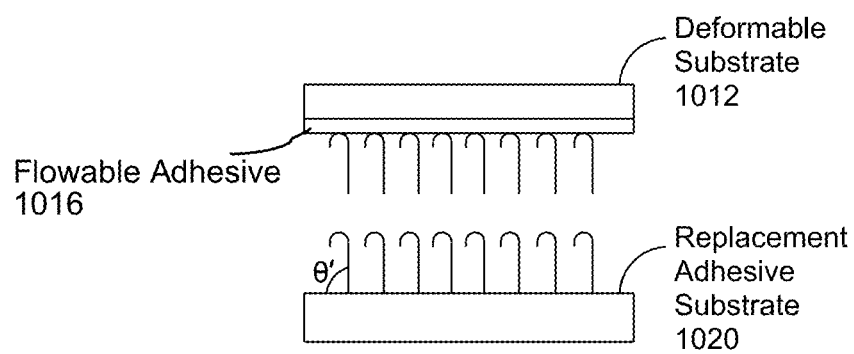

In another alternative embodiment illustrated in FIGS. 10D, 10E, and 10F, the relaxed state deformable substrate 1012 is attached to a replacement adhesive substrate 1020. As shown in FIG. 10D, a compressive force is applied to the double layer nanofiber forest 1004 to that the nanofibers form an angle $\Theta$ with the replacement adhesive substrate 1020. As shown in FIG. 10E, the two substrates are pulled apart with a separating force. As described above, the angle of the nanofibers within the forest relative to an underlying substrate is $\Theta'$, which is determined as a function of the relative adhesive strengths of the substrates 1012, 1020.

While not shown, it will be appreciated that a deformable substrate with an attached nanofiber forest can be deformed so as to decrease an areal density of the nanofiber forest. That is, using some of the techniques described above, a deformable substrate can be deformed to a second surface area greater than a starting surface area. The "de-densified" nanofiber forest can then be applied or used in its reduced-density state.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method comprising:
   providing an elastically deformable substrate having a surface with a first surface area in a first relaxed state;
   elastically deforming the elastically deformable substrate to a stretched state in which the surface has a second surface area greater than the first surface area;
   disposing a nanofiber forest on the surface of the elastically deformable substrate in the stretched state having the second surface area; and
   increasing an areal density of a nanofiber forest by allowing the elastically deformable substrate to relax into a second relaxed state having a third surface area that is less than the second surface area,
   wherein elastically deforming the elastically deformable substrate comprises applying an isotropic stress to the elastically deformable substrate.

2. A method comprising:
   providing an elastically deformable substrate having a surface with a first surface area in a first relaxed state;
   elastically deforming the elastically deformable substrate to a stretched state in which the surface has a second surface area greater than the first surface area;
   disposing a nanofiber forest on the surface of the elastically deformable substrate in the stretched state having the second surface area; and
   increasing an areal density of a nanofiber forest by allowing the elastically deformable substrate to relax into a second relaxed state having a third surface area that is less than the second surface area, wherein increasing the areal density of the nanofiber forest comprises more than doubling the areal density.

3. The method of claim 2, further comprising removing the nanofiber forest from the elastically deformable substrate after altering the areal density of the nanofiber forest.

4. The method of claim 2, wherein the elastically deformable substrate is deformed isotropically and is released anisotropically.

5. A method comprising:
   providing an elastically deformable substrate having a surface with a first surface area in a first relaxed state;
   elastically deforming the elastically deformable substrate to a stretched state in which the surface has a second surface area greater than the first surface area;
   disposing a nanofiber forest on the surface of the elastically deformable substrate in the stretched state having the second surface area; and
   increasing an areal density of a nanofiber forest by allowing the elastically deformable substrate to relax into a second relaxed state having a third surface area that is less than the second surface area,
   wherein disposing the nanofiber forest on the surface of the elastically deformable substrate comprises adhering the nanofiber forest to the elastically deformable substrate in the stretched state with a flowable adhesive,
   wherein the flowable adhesive responds to an applied stress by flowing to relax the applied stress.

6. The method of claim 5, wherein adhering the nanofiber forest to the elastically deformable substrate further comprises placing one of open ends or tangled ends of nanofibers of the nanofiber forest in contact with the flowable adhesive.

7. The method of claim 5, wherein the flowable adhesive comprises a continuous layer of flowable adhesive in both of the first relaxed state and the stretched state.

8. The method of claim 5, wherein the flowable adhesive is a polymer adhesive in a solvent.

9. The method claim 5, wherein the surface is planar, cylindrical or spherical.

10. The method of claim 5, wherein disposing the nanofiber forest on the elastically deformable substrate further comprises orienting the nanofiber forest so that a longitudinal axis of a straight portion of nanofibers of the nanofiber forest is approximately perpendicular to a plane of the surface.

* * * * *